United States Patent
Koepfer et al.

(10) Patent No.: US 11,555,485 B2
(45) Date of Patent: Jan. 17, 2023

(54) SHAPE MEMORY ALLOY ACTUATOR SUBASSEMBLY AND FLUIDIC VALVE INCORPORATING IT

(71) Applicants: ACTUATOR SOLUTIONS GMBH, Gunzenhausen (DE); ALFMEIER PRÄZISION SE, Treuchtlingen (DE)

(72) Inventors: Markus Koepfer, Stoedtlen-Regelsweiler (DE); Erich Doerfler, Landsberg (DE)

(73) Assignees: ACTUATOR SOLUTIONS GMBH, Gunzenhausen (DE); ALFMEIER PRÄZISION SE, Treuchtlingen (DE)

(*) Notice: Subject to any disclaimer, the term of this patent is extended or adjusted under 35 U.S.C. 154(b) by 0 days.

(21) Appl. No.: 17/415,961

(22) PCT Filed: Dec. 17, 2019

(86) PCT No.: PCT/IB2019/060913
§ 371 (c)(1),
(2) Date: Jun. 18, 2021

(87) PCT Pub. No.: WO2020/128826
PCT Pub. Date: Jun. 25, 2020

(65) Prior Publication Data
US 2022/0074394 A1 Mar. 10, 2022

(30) Foreign Application Priority Data
Dec. 18, 2018 (IT) .................. 102018000020047

(51) Int. Cl.
*F16K 31/00* (2006.01)
*F03G 7/06* (2006.01)
*F16K 11/22* (2006.01)

(52) U.S. Cl.
CPC .......... *F03G 7/06143* (2021.08); *F16K 11/22* (2013.01); *F16K 31/002* (2013.01)

(58) Field of Classification Search
CPC .... F03G 7/06143; F16K 31/025; F16K 11/22; F16K 31/002
See application file for complete search history.

(56) References Cited

U.S. PATENT DOCUMENTS 3,215,396 A * 11/1965 Bergsma ............... F16K 31/025
60/527
3,442,483 A * 5/1969 Schwartz ........... G05D 23/1921
137/877

(Continued)

FOREIGN PATENT DOCUMENTS

DE 102016219342 A1 4/2018
DE 102017204662 B3 7/2018

(Continued)

OTHER PUBLICATIONS

International Search Report and Written Opinion dated Mar. 5, 2020 in PCT/IB2019/060913, 18 pages.

(Continued)

*Primary Examiner* — Umashankar Venkatesan
(74) *Attorney, Agent, or Firm* — Element IP, PLC

(57) ABSTRACT

The present invention is inherent to an actuator subassembly comprising at least one bendable slender structure (12) mounted on a stationary body base (11) and carrying on a first surface an installation feature (17) and a plug (16) in its distal portion, the bending of the slender structure (12) being controlled by a shape memory alloy wire (13) through coupling means (15) located in its distal portion on a second surface opposite to the first surface. The invention also concerns a fluidic valve incorporating such an actuator subassembly.

17 Claims, 3 Drawing Sheets

(56) References Cited

U.S. PATENT DOCUMENTS

Figure 1:
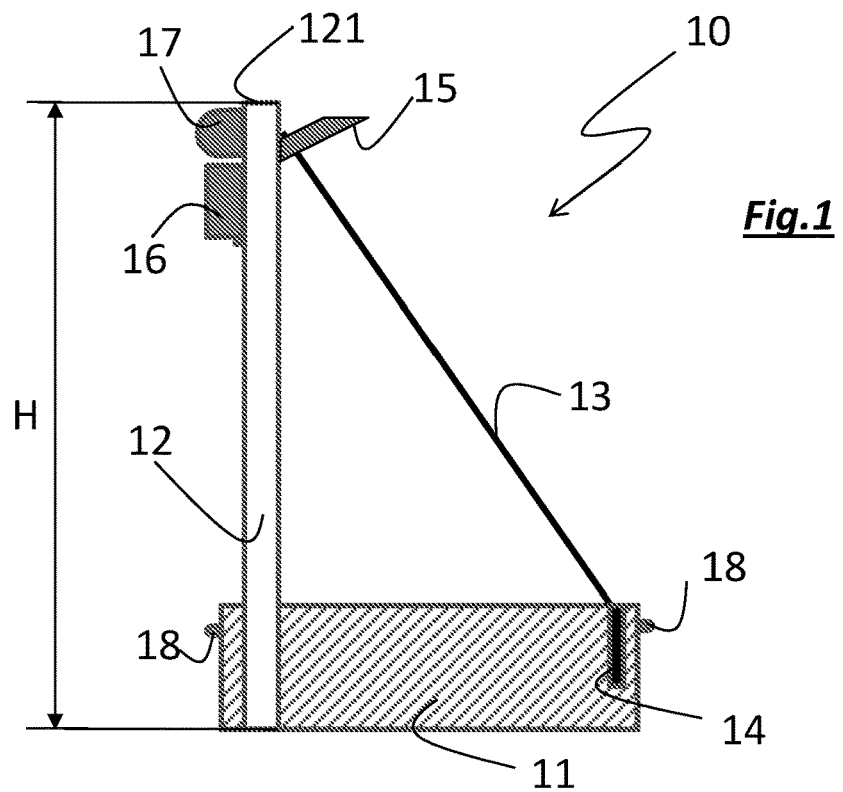

| | | | | |
|---|---|---|---|---|
| 3,613,732 | A | * | 10/1971 | Willson ............... F16K 31/025 |
| | | | | 60/527 |
| 4,067,539 | A | * | 1/1978 | Perl ........................ F23N 5/045 |
| | | | | 236/101 E |
| 4,681,296 | A | | 7/1987 | Shopsky |
| 7,815,161 | B2 | | 10/2010 | Saitoh et al. |
| 2012/0174572 | A1 | | 7/2012 | Clausi et al. |
| 2017/0211553 | A1 | | 7/2017 | Kawaguchi et al. |

FOREIGN PATENT DOCUMENTS

| | | | |
|---|---|---|---|
| DE | 102017213744 | B3 | 10/2018 |
| DE | 102018206385 | B3 | 7/2019 |
| WO | WO-2018038909 | A1 | 3/2018 |
| WO | WO-2018119508 | A1 | 7/2018 |
| WO | WO-2019149498 | A1 | 8/2019 |

OTHER PUBLICATIONS

International Preliminary Report on Patentability dated Mar. 2, 2021 in PCT/IB2019/060913, 14 pages.
Written Opinion of the International Preliminary Examining Authority dated Nov. 5, 2020 in PCT/IB2019/060913, 5 pages.

* cited by examiner

SHAPE MEMORY ALLOY ACTUATOR SUBASSEMBLY AND FLUIDIC VALVE INCORPORATING IT

The present invention is inherent to a shape memory alloy (SMA) wire actuator subassembly and to fluidic valves incorporating such actuator subassembly.

Generally speaking, the use of SMA wires as actuating elements provides various advantages with respect to other actuating systems in terms of weight, power consumption, costs.

A field in which the advantages given by the use of shape memory alloy wires is recognized since a long time is the fluidic valve control, as described in the U.S. Pat. Nos. 3,835,659 and 4,973,024, and a particular application where these advantages are of particular relevance is micro-fluidic valves and the so-called "lab on a chip" application such as described in the paper "Electronic control of elastomeric microfluidic circuits with shape memory actuators" by Vyawahare et al, published in 2008 on labchip, number 8, pages 1530-1535. In this paper, the SMA wire is looped around a flexible channel for controlling its diameter up to its closing. The solution described in this paper is far from ideal for the stress applied to the channel when it needs to be fully closed.

The use of SMA wires coupled to a resilient member and biasing means for valve actuation is described in the international patent application WO 2010/142453, US patent application 2002/171055 describes a poppet operated by a shape memory alloy wire in conjunction with a bistable latching mechanism, while two shape memory alloy wires in antagonistic configuration to open/close a valve port are described in U.S. Pat. No. 9,958,081.

U.S. Pat. No. 7,815,161, US patent application 2012/0174572 and the international patent application WO 2018/119508 describe fluidic valves with SMA elements connected with at least one movable or deformable element, with the associated problem of a reliable connection to the current supply element.

Purpose of the present invention is to provide a simpler actuator subassembly suitable to be used in a valve, that differently from the other actuators known in the art relies on the properties of a bendable slender structure to provide a simpler actuator structure, without the need for additional control elements such as biasing means or a latching mechanism, as well as the possibility to easily fit in a plurality of actuated elements to provide additional/multiple functions to the actuator subassembly. In a first aspect thereof, it consists in an actuator subassembly comprising a body with a stationary base with two terminals to mechanically fix and supply current to at least one shape memory alloy wire connected to said two terminals, at least one bendable slender structure whose bending is controlled by the shape memory alloy wire, the bendable slender structure having a height H with slenderness ratio ≥3:1, a proximal end and a distal end, the proximal end being fixed to said stationary body base, coupling means to connect a first surface of the bendable slender structure with the stationary body base through the shape memory alloy wire, an installation feature and a plug next to it on an opposite surface of the bendable slender structure with the installation feature located between the plug and the distal end, wherein both the plug and the shape memory alloy wire coupling means have a distance within H/3 from the bendable slender structure distal end.

Preferably, the plug and the shape memory alloy coupling means have a distance within H/5 from the bendable slender structure distal end, and height H is comprised between 10 mm and 20 mm.

The term slenderness ratio indicates, for a given geometrical structure, the ratio between its height H and its smallest transverse dimension, i.e. for flat structures their thickness. Even though for the present invention it is important for the slender structure to have at least a minimal ratio of 3:1, preferably such ratio is comprised between 3:1 and 10:1.

Figure 2:
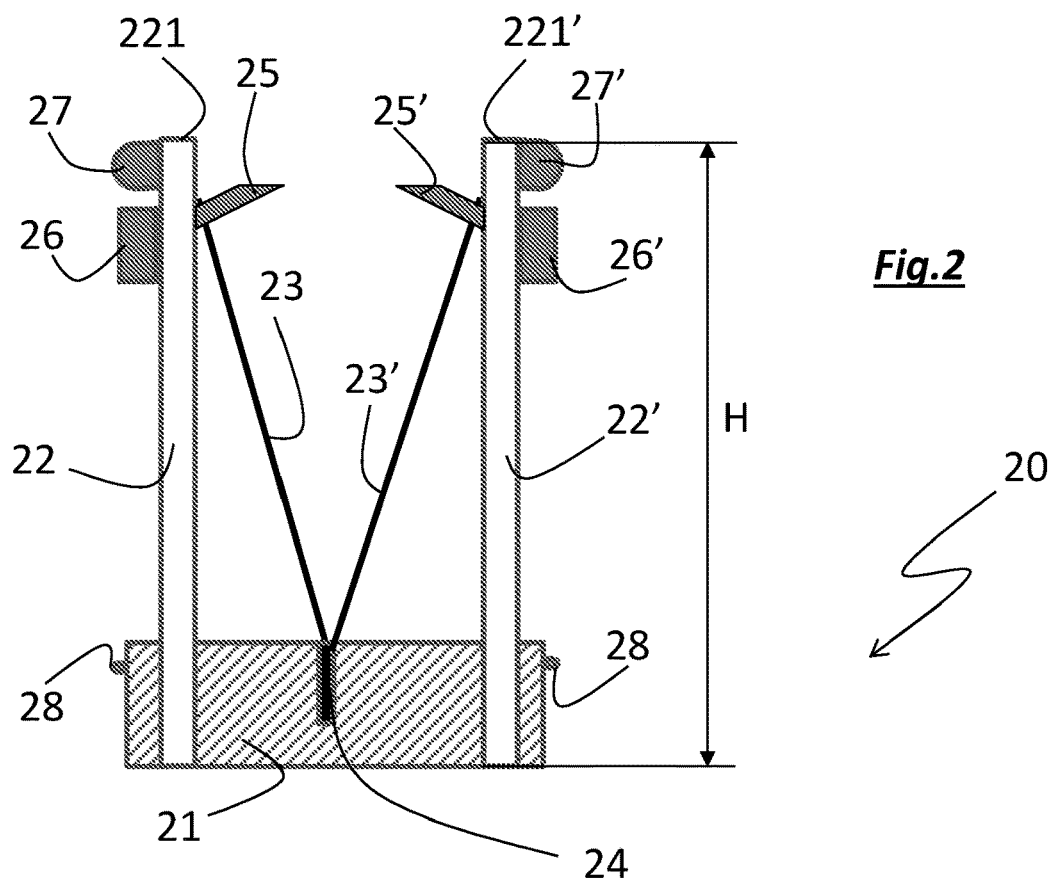
Figures 3, 4:
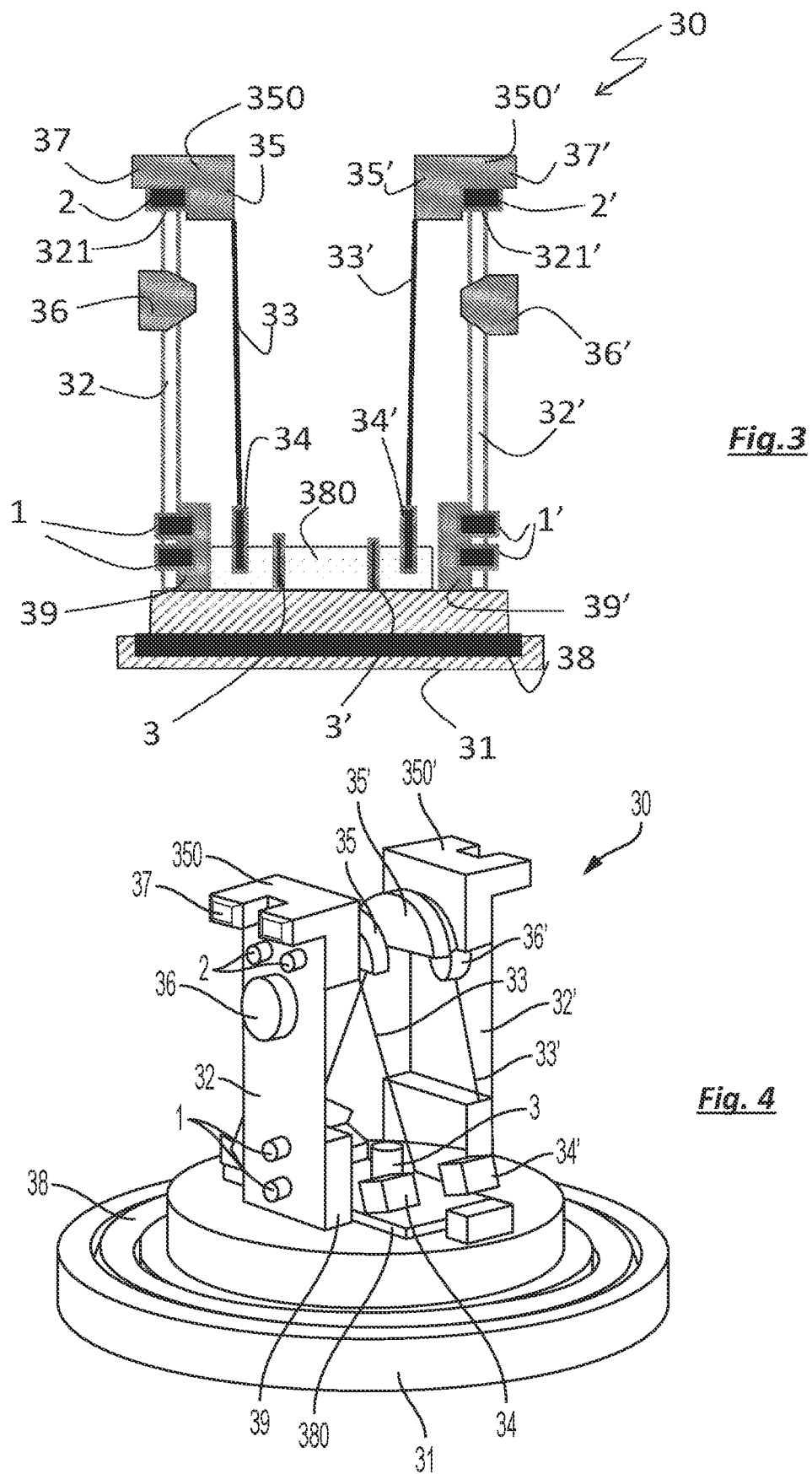
Figure 5:
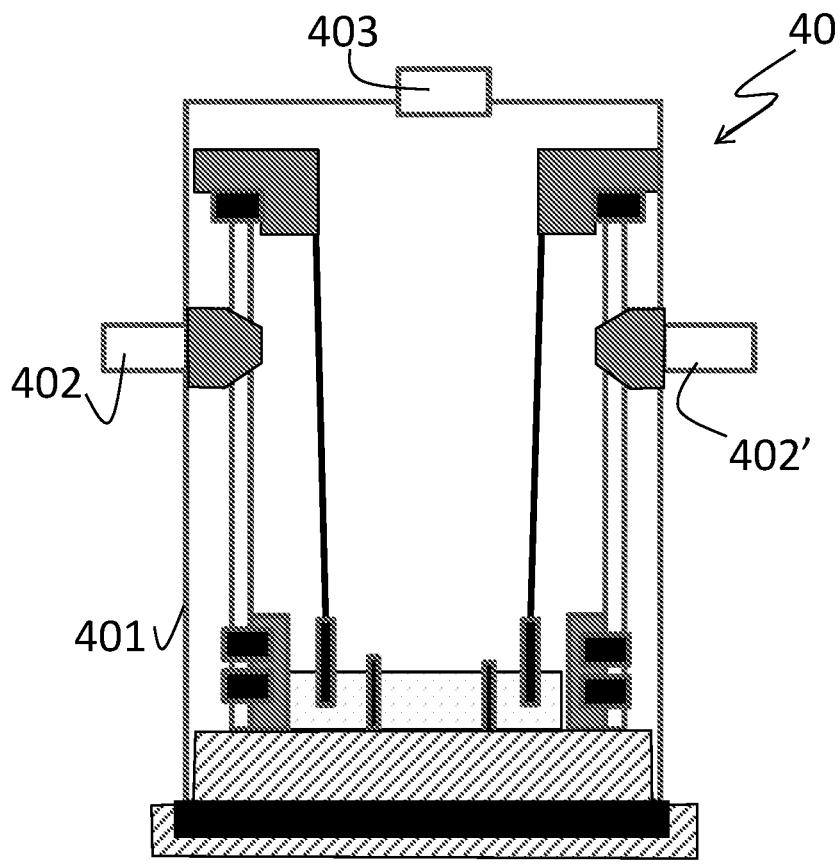
Figure 6:
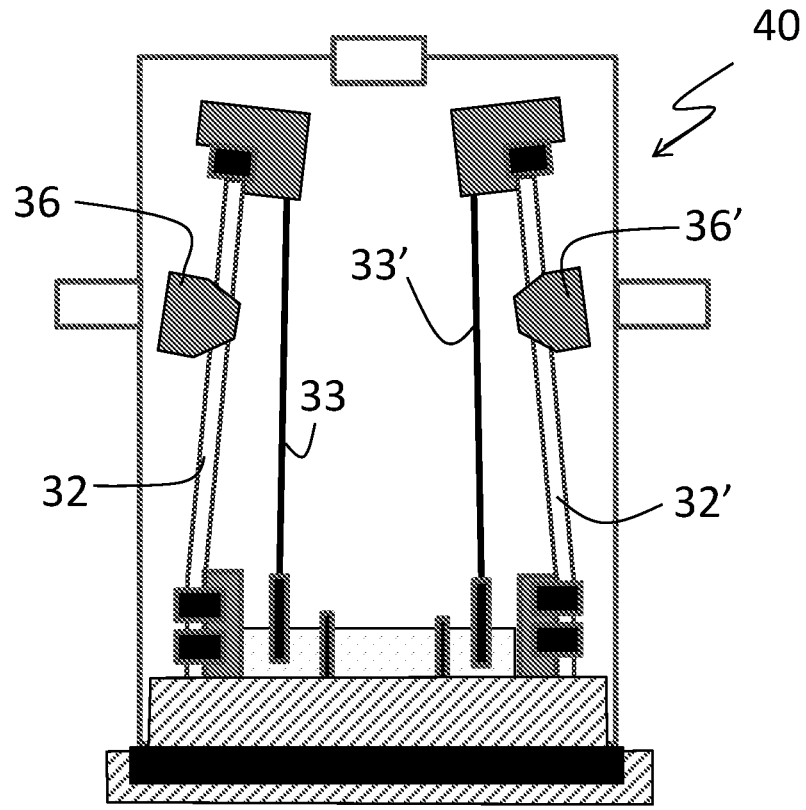

The invention will be further illustrated in some embodiments thereof with the help of the following figures wherein:

FIG. 1 is a schematic view of a cross-section of an actuator subassembly according to a first embodiment of the present invention, FIG. 2 is a schematic view of a cross-section of an actuator subassembly according to a second embodiment of the present invention, FIG. 3 is a schematic view of a cross-section of an actuator subassembly according to a third embodiment of the present invention, FIG. 4 is a perspective view of the third embodiment of FIG. 3, and FIGS. 5 and 6 are schematic views of a cross-section of a valve containing an actuator subassembly according to the present invention, respectively in the closed (unactuated) configuration and in the open (actuated) configuration.

In the figures, the size and the dimensional ratios of the various elements shown have been altered in some cases in order to help understanding the drawings, with particular but not exclusive reference to the size and relative sizing of the plug and installation features in FIGS. 1-4. Also, some ancillary or additional elements not necessary for the invention understanding, such as a current supply module for the shape memory alloy wire, have not been shown since they are ordinary means known in the technical field and not related to the inventive concept of present invention.

A first embodiment of an actuator subassembly according to present invention is shown in the schematic cross-section of FIG. 1. Actuator subassembly 10 has a stationary body base 11 holding a bendable slender structure 12, protruding therefrom substantially orthogonally, two terminals 14, only one of them being visible in the cross-section, embedded in the stationary body base 11, said terminals 14 being configured to supply current and mechanically fix the extremities of a shape memory alloy wire 13. The central portion of the shape memory alloy wire 13 is hooked onto an arm 15, forming an acute angle with the bendable slender structure 12, such arm 15 acting as coupling means between the stationary body base 11 and the bendable slender structure 12 for the shape memory alloy wire 13.

The term stationary base is to be interpreted in the context of actuator subassembly that may be mounted onto movable elements, so the base is stationary with respect to the actuator subassembly body, meaning that the at least one shape memory alloy wire does not cause its movement, displacement or deformation.

Proximal and distal end of the bendable slender structure are to be interpreted relative to the proximity to the stationary base, more specifically proximal end means the extremity in contact with the stationary base, distal end means the extremity far away from the stationary base and not contacting it.

In the proximity of the distal end 121 of the bendable slender structure 12, on the opposite side with respect to the side where the shape memory alloy wire 13 is coupled, there is an installation feature 17 and next to it a plug 16. For the purpose of the present invention, it is important that plug 16 and the coupling means 15 are in the proximity of the distal end 121. With the term "proximity" it is meant that the shape memory alloy wire 13 coupling means, i.e. the inclined arm 15, and plug 16 are within H/3 from the distal end 121.

The shape memory alloy wire 13 connection/coupling onto the distal portion of the bendable slender structure 12 ensures that the force exerted by the shape memory alloy contraction is translated in a most efficient bending of the slender structure 12, while the positioning of the installation feature 17 in the distal part (between plug 16 and the distal end 121) guarantees higher reliability and more flexibility of use in the final devices, since the installation feature 17 will be above any other relevant component of the system, as well as preventing damages to the sealing area during the actuator subassembly installation in the final device.

FIG. 1 also shows a rubber sealing gasket 18 around the stationary body base 11 for tight sealing of the actuator subassembly. This feature is relevant when the subassembly actuator is intended for use in fluid control applications.

An actuator subassembly according to a second embodiment of present invention is shown in the schematic cross-section of FIG. 2. The difference with respect to the first embodiment of FIG. 1 is that in this actuator subassembly 20, two bendable slender structures 22, 22' are coupled to the stationary body base 21 via two shape memory alloy wires 23, 23', hooked onto arms 25, 25' in the proximity of the distal ends 221, 221'. The stationary body base 11 holds a couple of terminals 24 (only one of them being visible in the cross-section) for the concurrent mechanical fixing and current supply of the two shape memory alloy wires 23, 23'.

Similarly to the first embodiment, also in this configuration on each bendable slender structure 22, 22' there are a plug 26, 26' and an installation feature 27, 27' next to it, on the opposite side with respect to the inclined arm 25, 25' and a sealing gasket 28 is arranged around the stationary body base 21. An obvious variant of this embodiment envisions the use of a single wire hooking on both bendable slender structures 22, 22'. Needless to say, the number of bendable slender structures can be easily increased to four (one per each side of the actuator subassembly when it has a substantially quadrangular shape in plan) to increase the number of functions controlled by the same subassembly, and even more if multiple bendable slender structures are fitted on the same side one near to the other.

An actuator subassembly according to a third and preferred embodiment of present invention is shown in the schematic cross-section of FIG. 3. In the actuator subassembly 30 according to this embodiment, there are two shape memory alloy wires 33, 33' each connected to a respective couple of terminals 34, 34' (as per previous figures only one terminal of each couple is visible in the cross-section) and, differently from the previous embodiments, to an L-shaped block 350, 350' extending over the distal end 321, 321' of the bendable slender structure 32, 32' controlled by said shape memory alloy wire 33, 33'.

Basically, the portions 35, 35' of the L-shaped blocks 350, 350' on the inner side of the actuator subassembly 30 act as coupling means, while the portions 37, 37' on the outer side (i.e. the same side of plugs 36, 36') act as installation features. In this embodiment, the stationary body base 31 carries one holding element 380 for the two couples of terminals 34, 34' and two additional holding elements 39, 39' for fixing the proximal portions of the bendable slender structures 32, 32' through locking means 1, 1'.

Similarly, locking means 2, 2' are provided for securing the L-shaped blocks 350, 350' onto the distal ends 321, 321' of the bendable slender structures 32, 32' while locking means 3, 3' are provided for securing the holding element 380 onto the stationary body base 31.

The stationary body base 31 may be conformed with an indentation containing a suitable sealing gasket 38 to allow for tight sealing coupling with a suitable mounting case of a final device (not shown).

The most relevant of the above elements of actuator subassembly 30 are also depicted in perspective view in FIG. 4.

FIGS. 1-4 highlight a major difference between two types of embodiments encompassed by the present invention, since in FIGS. 1 and 2 the shape memory alloy wires 13, 23, 23' are in contact, in their mid-section, with both the bendable slender structures 12, 22, 22' and the coupling means 15, 25, 25'. On the contrary, in FIGS. 3 and 4 the shape memory alloy wires 33, 33' are spaced apart from the bendable slender structures 32, 32' and in contact, in their mid-section, only with the coupling means 35, 35'.

A minor difference is instead given by the plug, that in the case of FIGS. 1 and 2 is simply attached to the outer surface of the bendable slender structure, whereas in FIGS. 3 and 4 goes through it.

Given that both the plug and the shape memory alloy wire coupling means have a given size and extension, in order to determine their distance from the distal end of the bendable slender structure the distalmost surface of the plug shall be considered, while for the coupling means the distance will be calculated from the distalmost point of contact with the shape memory alloy wire.

Another aspect that is important to underline is that the bendable slender structures have always been represented parallel to each other and orthogonal to the stationary body base, even though they may be intentionally inclined with a small angle. In particular, it has been found that it may be advantageous that the bendable slender structures do not protrude orthogonally to the stationary body base, but form an angle between 80° and 100° with the stationary body base, preferably with an inclination toward the outside of the actuator subassembly, i.e. the formed angle is comprised between 80° and 89° when measured on the outer surface of the bendable slender structures.

The present invention is not limited to a specific type of shape memory alloy wire, even though from a geometrical point of view are usefully used SMA wires with a diameter comprised between 25 μm and 250 μm. In this respect, it is important to underline that as the shape memory alloy wires are real objects, depart from a circular section is possible, therefore the term diameter is to be intended as the diameter of the smallest enclosing circle.

The preferred bendable slender structure thickness is comprised between 0.05 and 0.15 mm. As per shape memory alloy diameter, also bendable slender structures are real objects, therefore their thickness may be not uniform. For the purposes of the present invention it is intended as bendable slender structure thickness the minimal thickness of such structures.

With regards to the ratio between the bendable slender structure thickness and the diameter of the controlling shape memory alloy wire, it is more advantageously comprised between 1 and 3.

Even though the present invention is not limited to any specific shape memory alloy, preferred is the use of Ni—Ti based alloys such as Nitinol that may exhibit alternately a superelastic wire behavior or shape memory alloy behavior according to its processing. The properties of Nitinol and methods allowing to achieve them are widely known to those skilled in the art, see e.g. the article "A Study of the Properties of a High Temperature Binary Nitinol Alloy Above and Below its Martensite to Austenite Transformation Temperature" by Dennis W. Norwich presented at the SMST 2010 conference.

Nitinol may be used as such or its characteristics in terms of transition temperature may be tailored by adding elements such as Hf, Nb, Pt, Cu. The proper choice of material alloy and its characteristics are commonly known by a person those skilled in the art.

Also, the shape memory alloy wires may be used "per se" or with a coating/sheath to improve their thermal management, i.e. their cooling after being actuated. The coating sheath may be uniform, such as described in the U.S. Pat. No. 9,068,561 that teaches how to manage residual heat by resorting to an electrically insulating coating which is a heat conductor, while U.S. Pat. No. 6,835,083 describes a shape memory alloy wire having an enclosing sheath capable to improve cooling after every actuation cycle. Also a coating made with or containing phase changing materials, as described in the U.S. Pat. No. 8,739,525, may be advantageously employed.

In a second aspect thereof the present invention is directed to a fluidic valve having a case with at least two ports, wherein the opening and closing of at least one of said ports is achieved through an actuator subassembly according to any of the above-described embodiments.

FIG. 5 represents a schematic view of a cross-section of a valve 40 containing an actuator subassembly according to the present invention, in the closed (unactuated) configuration. Valve 40 comprises an external case 401, two inlet openings 402, 402' and one outlet opening 403. When the shape memory alloy wires 33, 33' are actuated (FIG. 6) by Joule heating, they shorten thus exerting a force on the bendable slender structures 32, 32' whose bending moves the two plugs 36, 36' away from the two inlet openings 402, 402' allowing the fluid to enter the valve and be delivered through outlet opening 403.

Generally speaking, the plugs of the subassembly actuator according to the present invention may be directly connected with the valve inlets, or a suitable orifice for flow regulation can be mounted on such valve inlets.

The present invention is not limited to this specific valve porting configuration that represents only a preferred embodiment. In an obvious variant, opening 403 could be the inlet opening for a fluid to be selectively delivered through outlets 402, 402' according to which SMA wire is actuated (selective delivery) or delivered through both outlets 402, 402' in case of concurrent actuation.

Other valve porting options envision the presence of only two openings when an actuator subassembly as shown in FIGS. 1 and 2 is used, i.e. when a single shape memory alloy wire is present. Further modifications of the above-described embodiments that are obvious to a person skilled in the art are intended to be within the scope of the following claims. All patents and publications mentioned in the specification are indicative of the levels of skill of those skilled in the art to which the disclosure pertains.

Also, the term "fluid" has to be interpreted extensively to encompass any substance capable to flow through suitable valve ports such as liquid substances with particular reference to oil- and water-based liquids, as used for example in hydraulic systems, or gaseous substances such as air, being it compressed or used in systems operating below normal ambient pressure (under partial vacuum).

The invention claimed is:

1. An actuator subassembly, comprising:
   a body with a stationary base with at least two terminals configured to mechanically fix and supply current to a shape memory alloy wire;
   at least one shape memory alloy wire connected to said two terminals;
   at least one bendable slender structure whose bending is controlled by said shape memory alloy wire, said bendable slender structure having a height H with slenderness ratio ≥3:1, a lower end fixed to said stationary base, and an upper end;
   coupling means to connect a first surface of the bendable slender structure with the body stationary base through the shape memory alloy wire; and
   an installation feature and a plug arranged on a second surface of the bendable slender structure opposite to said first surface, wherein the plug is arranged on the bendable structure at a position lower than the installation feature,
   wherein both said plug and said coupling means are disposed at a vertical distance within a third of the height from said upper end of the bendable slender structure, and
   wherein the actuator subassembly does not comprise additional biasing means for the at least one shape memory alloy wire.

2. The actuator subassembly according to claim 1, wherein the number of bendable slender structures is two and the number of shape memory alloy wires is two.

3. The actuator subassembly according to claim 1, wherein the shape memory alloy wire is in contact with both the bendable slender structure and the coupling means.

4. The actuator subassembly according to claim 1, wherein the shape memory alloy wire is spaced apart from the slender bendable structure by the relative coupling means.

5. The actuator subassembly according to claim 2, comprising two shape memory alloy wires each connected to a respective couple of terminals and to an L-shaped block extending over the upper end of the slender bendable structure controlled by said shape memory alloy wire, a first portion of said L-shaped block on the inner side of the actuator subassembly acting as coupling means and a second portion of the L-shaped block on the outer side of the actuator subassembly acting as installation feature.

6. The actuator subassembly according to claim 5, wherein the body stationary base carries one holding element for the two couples of terminals and two additional holding elements for fixing the lower portions of the bendable slender structures.

7. The actuator subassembly according to claim 1, wherein the bendable slender structure has a thickness comprised between 0.05 mm and 0.15 mm and/or has a height H comprised between 10 mm and 20 mm.

8. The actuator subassembly according to claim 1, wherein the shape memory alloy wire has a diameter comprised between 25 µm and 250 µm.

9. The actuator subassembly according to claim 7, wherein a ratio between the thickness of the bendable slender structure and a diameter of the shape memory alloy wire is comprised between 1 and 3.

10. The actuator subassembly according to claim 1, wherein an angle formed by the bendable slender structure with the stationary base body is comprised between 80° and 89° when measured on an outer surface of the bendable slender structure so as to have it inclined toward the outside of the actuator subassembly.

11. The actuator subassembly according to claim 1, wherein a sealing feature is present on the body stationary base.

12. A fluidic valve having a case with at least two ports, wherein the fluidic valve comprises the actuator subassembly according to claim 1 that performs the opening and closing of at least one of said ports.

13. The fluidic valve according to claim 12, wherein on at least one of said ports there is installed a flow regulating orifice.

14. A fluidic valve having a case with at least two ports, wherein the fluidic valve comprises the actuator subassembly according to claim 11 that performs the opening and closing of at least one of said ports, wherein the sealing feature provides a leak tight connection between the actuator subassembly body stationary base and the valve case.

15. The actuator subassembly according to claim 1, wherein said bendable slender structure has a height H with slenderness ratio $\geq 10:1$.

16. The actuator subassembly according to claim 1, wherein both said plug and said coupling means are disposed at a vertical distance within a fifth of the height from said upper end of the bendable slender structure.

17. The fluidic valve according to claim 12, wherein the actuator subassembly performs the opening and closing of two said ports.

\* \* \* \* \*